(12) United States Patent
Hom

(10) Patent No.: US 11,332,273 B2
(45) Date of Patent: May 17, 2022

(54) CONTAINER WITH VARIABLE VOLUME

(71) Applicant: Colgate-Palmolive Company, New York, NY (US)

(72) Inventor: Frank Hom, Wayne, NJ (US)

(73) Assignee: Colgate-Palmolive Company, New York, NY (US)

( * ) Notice: Subject to any disclaimer, the term of this patent is extended or adjusted under 35 U.S.C. 154(b) by 21 days.

(21) Appl. No.: 16/771,865

(22) PCT Filed: Dec. 10, 2018

(86) PCT No.: PCT/US2018/064714
§ 371 (c)(1),
(2) Date: Jun. 11, 2020

(87) PCT Pub. No.: WO2019/118332
PCT Pub. Date: Jun. 20, 2019

(65) Prior Publication Data
US 2021/0171234 A1 Jun. 10, 2021

Related U.S. Application Data

(60) Provisional application No. 62/597,055, filed on Dec. 11, 2017.

(51) Int. Cl.
*B65D 1/02* (2006.01)
*B65D 21/08* (2006.01)
(Continued)

(52) U.S. Cl.
CPC ......... *B65D 1/0292* (2013.01); *B65D 21/086* (2013.01); *B29C 49/06* (2013.01);
(Continued)

(58) Field of Classification Search
CPC .. B65D 1/0292; B65D 21/086; B65D 1/0207; B65D 21/08; B65D 21/083;
(Continued)

(56) References Cited

U.S. PATENT DOCUMENTS 4,456,134 A * 6/1984 Cooper ............... B65D 1/0292
215/12.1
4,492,313 A * 1/1985 Touzani ............... B65D 1/0292
215/372
(Continued)

FOREIGN PATENT DOCUMENTS

CN 1689918 A 11/2005
CN 1787950 A 6/2006
(Continued)

OTHER PUBLICATIONS

International Search Report and Written Opinion of the International Searching Authority in International Application No. PCT/US2018/064714 dated May 7, 2019.

*Primary Examiner* — Shawn M Braden

(57) ABSTRACT

A container (100) includes a body (110) having an upper end (104) and a lower end (106). The upper end has an opening formed therethrough. The body defines a plurality of ribs (110) between the upper end and the lower end that are configured to actuate between an expanded state and a compressed state to vary a volume inside the body. A sleeve (500) is positioned at least partially around the body. The sleeve inhibits one or more of the plurality of ribs that are in the compressed state from actuating into the expanded state.

15 Claims, 7 Drawing Sheets

(51) Int. Cl.
*B29C 49/06* (2006.01)
*B29L 31/00* (2006.01)

(52) U.S. Cl.
CPC ............ *B29L 2031/7158* (2013.01); *B65D 2501/0018* (2013.01)

(58) Field of Classification Search
CPC ................ B65D 79/005; B65D 81/2076; B65D 81/245; B65D 83/0055
See application file for complete search history.

(56) References Cited

U.S. PATENT DOCUMENTS

| | | |
|---|---|---|
| 4,873,100 A | 10/1989 | Dirksing et al. |
| 5,269,428 A * | 12/1993 | Gilbert ............... B65D 1/0292 215/376 |
| 6,116,448 A | 9/2000 | Fragos |
| 6,431,406 B1 * | 8/2002 | Pruett ............... B65D 1/0292 215/900 |
| D731,896 S | 6/2015 | Lederer |
| 9,370,198 B2 | 6/2016 | Gamburg et al. |
| 2003/0121881 A1 | 7/2003 | Higuchi |
| 2005/0139573 A1 | 6/2005 | Higuchi |
| 2019/0168915 A1 * | 6/2019 | Gabriel ............... B65D 1/0292 |

FOREIGN PATENT DOCUMENTS

| | | |
|---|---|---|
| CN | 101636323 A | 1/2010 |
| EP | 1634811 | 3/2006 |
| GB | 2474650 | 4/2011 |
| JP | H0880945 | 3/1996 |
| JP | 2003128157 | 5/2003 |
| JP | 4220996 | 2/2009 |
| KR | 20110069554 | 6/2011 |
| WO | 1999/020534 | 4/1999 |

* cited by examiner

CONTAINER WITH VARIABLE VOLUME

BACKGROUND

Currently, containers are manufactured in a variety of sizes (e.g., volumes) to accommodate user needs. For example, a single type of product, such as a cleaning solution, may be offered in a small container (e.g., 33 ounces), a medium container (e.g., 47 ounces), a large container (e.g., 56 ounces), and an extra-large container (e.g., 67 ounces). Some containers are variable in size (e.g., volume). Such containers may be compressed to reduce the volume and expanded to increase the volume. Expanding the containers, however, may exert a force on the container that may damage the container. It would therefore be desirable to have a container that is configured to be reduced in size but not expanded in size.

BRIEF SUMMARY

A container includes a body having an upper end and a lower end. The upper end has an opening formed therethrough. The body defines a plurality of ribs between the upper end and the lower end that are configured to actuate between an expanded state and a compressed state to vary a volume inside the body. A sleeve is positioned at least partially around the body. The sleeve inhibits one or more of the plurality of ribs that are in the compressed state from actuating into the expanded state.

Optionally, the sleeve is configured to allow one or more of the plurality of ribs that are positioned within the sleeve and in the expanded state to actuate into the compressed state.

Optionally, at least one of the plurality of ribs is non-planar.

Optionally, an axial distance between the lower end of the body and a first rib of the plurality of ribs varies proceeding around a circumference of the body.

Optionally, a first rib of the plurality of ribs includes an upper portion and a lower portion. The upper portion and the lower portion are oriented at a first angle with respect to one another from about 40 to about 140° when the first rib is in the expanded state. The upper portion and the lower portion are oriented at a second angle with respect to one another from about 2° to about 200 when the first rib is in the compressed state.

Optionally, the container also includes a handle. The plurality of ribs includes a first set of ribs and a second set of ribs. The handle is positioned between the first set of ribs and the second set of ribs.

Optionally, a first rib in the first set of ribs is symmetric to a second rib in the second set of ribs through a plane of symmetry that extends through the handle.

Optionally, the plurality of ribs includes a first rib and a second rib. An axial distance between the lower end of the body and the first rib varies from a first axial distance at a first angular location on the body to a second axial distance at a second angular location on the body that is angularly-offset from the first location. The first axial distance is greater than the second axial distance. An axial distance between the lower end of the body and the second rib varies from a third axial distance at the first angular location on the body to a fourth axial distance at the second angular location on the body. The third axial distance is less than the fourth axial distance.

Optionally, the body comprises includes a first radial recess defined between a first pair of the plurality of ribs, and a second radial recess defined between a second pair of the plurality of ribs. The sleeve includes an upper end and a lower end. The upper end of the sleeve is positioned in the first radial recess in the body, and the lower end of the sleeve is positioned in the second radial recess in the body.

In another embodiment, the container includes a body having an upper end and a lower end. The upper end has an opening formed therethrough. The body defines a plurality of ribs between the upper end and the lower end that are configured to actuate between an expanded state and a compressed state to vary a volume inside the body. A first rib of the plurality of ribs is non-planar such that an axial distance between the lower end of the body and a first rib of the plurality of ribs varies proceeding around the body. A sleeve is positioned at least partially around the body that inhibits one or more of the plurality of ribs that are positioned within the sleeve and in the compressed state from actuating into the expanded state. The sleeve is configured to allow one or more of the plurality of ribs that are positioned within the sleeve and in the expanded state to actuate into the compressed state.

Optionally, the sleeve is configured to stretch in a radial direction and an axial direction.

Optionally, the sleeve is configured to stretch in a radial direction but not in an axial direction.

Optionally, an axial distance between the lower end of the body and an upper end of the sleeve varies proceeding around the body such that a shape of the upper end of the sleeve substantially corresponds to the first rib.

Optionally, an upper end of the sleeve is positioned on an upper shoulder of the body, and a lower end of the sleeve is positioned under the lower end of the body.

Optionally, the body includes a recess that is defined between two ribs of the plurality of ribs. The sleeve includes an upper end and a lower end. The upper end of the sleeve is at least partially positioned in the recess in the body.

A method for using a container is also disclosed. The method includes compressing a first rib defined by a body of the container into a compressed state to reduce a volume inside the body. The method also includes positioning a sleeve around the body after the first rib is in the compressed state to inhibit the first rib from actuating into an expanded state.

Optionally, the body of the container has an upper end and a lower end. The upper end has an opening formed therethrough. The body defines a plurality of ribs between the upper end and the lower end that are configured to actuate between the expanded state and a compressed state to vary a volume inside the body. The first rib is one of the plurality of ribs. The sleeve is positioned at least partially around the body.

Optionally, positioning the sleeve around the body includes positioning an upper end of the sleeve in a first radial recess defined in the body, pulling the sleeve to a full length of the sleeve, and positioning a lower end of the sleeve in a second radial recess defined in the body.

Optionally, the method also includes compressing a second rib defined by the body into the compressed state after the sleeve is positioned around the body. Compressing the second rib moves the upper end of the sleeve closer to the lower end of the sleeve, thereby reducing the length of the sleeve.

Optionally, the method also includes adjusting the sleeve after the second rib is compressed. Adjusting the sleeve includes positioning the upper end of the sleeve in a third radial recess defined in the body that is above the first radial recess, or positioning the lower end of the sleeve in a third radial recess defined in the body that is below the second radial recess.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 1:
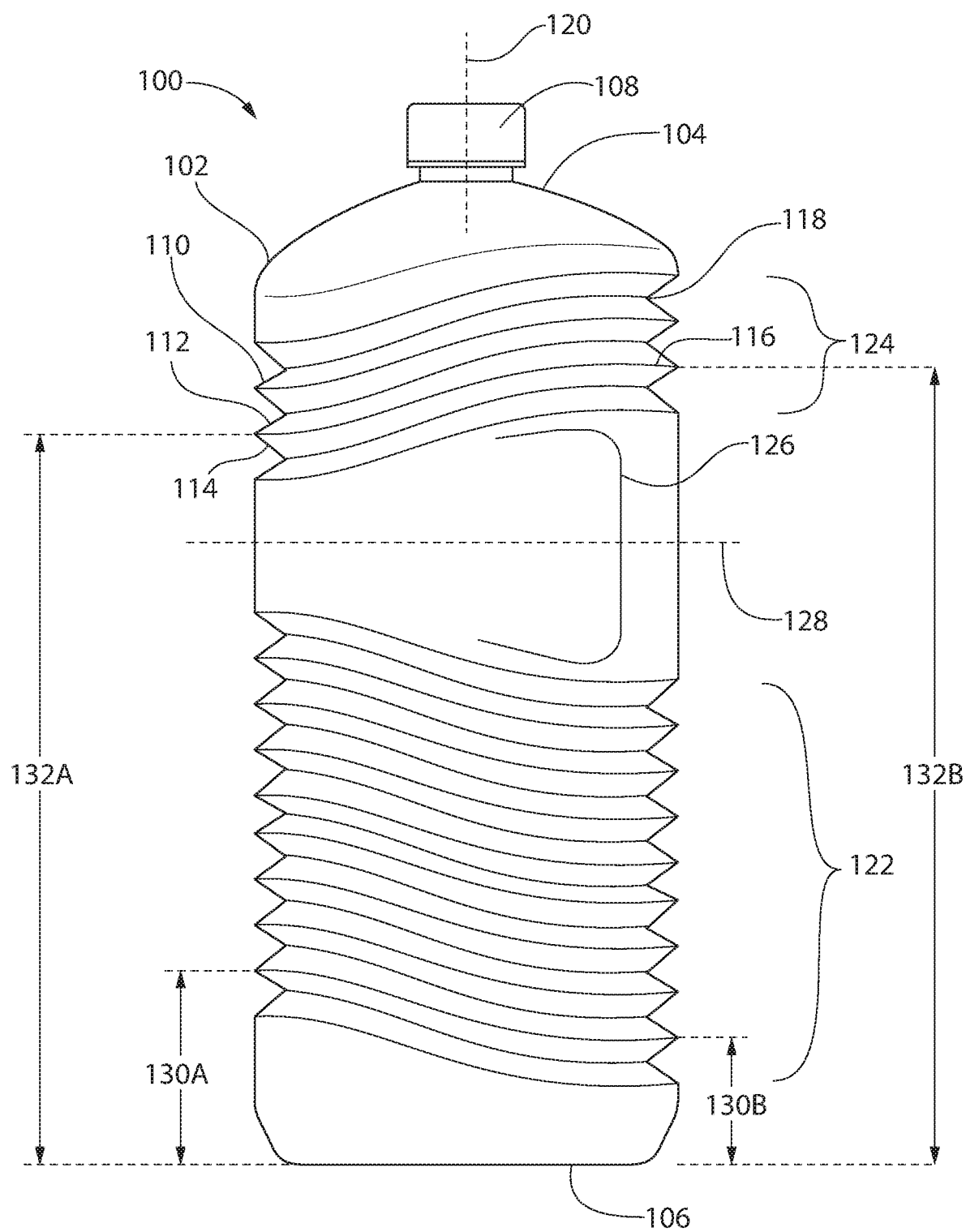
FIG. 1 depicts a side view of an example of a container having a first volume, according to an embodiment.

FIG. 1 depicts a side view of an example of a container 100 having a first volume, according to an embodiment. The container 100 may include a body 102 defining an internal volume. A fluid may be disposed within the internal volume. The fluid may be a liquid, a paste, a gel, a foam, an emulsion, or the like. The fluid may be or include a cleaning solution (e.g., a laundry detergent, a dish washing detergent, a floor cleaner, a surface cleaner, a hand soap, a body wash), a fabric softener, a fabric conditioner, a dentifrice, a hair care product, a mouthwash, a skin cream, a deodorant composition, an antiperspirant composition, a food, a drink, or the like.

The body 102 may be made from plastic, polyethylene terephthalate (PET), high-density polyethylene (HDPE), polypropylene (PP), any other flex bottle resin, or the like. The body 102 may be produced or manufactured via a blow-molding process, injection stretch blow molding (ISBM), extrusion blow molding (EBM), or the like.

The body 102 may have an upper end 104 and a lower end 106. The upper end 104 may have an opening formed therethrough, which may be sealed by a removable cap 108. The lower end 106 may be or include a flat base. The body 102 may define a plurality of ribs 110 (also referred to as bellows) between the upper and lower ends 104, 106. As shown, each rib 110 may include an upper portion 112 and a lower portion 114. The upper and lower portions 112, 114 may be oriented at a first angle α (see FIG. 2) with respect to one another when the respective rib 110 is in a first (e.g., expanded) state, as shown in FIG. 1. The first angle α may be from about 20° to about 160°, about 40° to about 140°, or about 60° to about 120°. As shown, the first angle α is about 80°. As a result, a cross-sectional length (e.g., a diameter) of the ribs 110 may be largest at an intersection 116 between the upper portion 112 and the lower portion 114, and the cross-sectional length (e.g., diameter) of the ribs 110 may be smallest at an intersection 118 between two adjacent ribs (e.g., at the intersection of the upper portion 112 of a lower rib 110 and the lower portion 114 of an upper rib 110).

The ribs 110 may be planar or may not be planar (as shown). In addition, the intersection 116 between the upper portion 112 and the lower portion 114 of each rib 110 may not be perpendicular to a central longitudinal axis 120 through the body 102. Rather, the ribs 110 may be substantially wave-shaped when viewed from the side of the container 100, as shown. More particularly, an axial distance (e.g., parallel to the longitudinal axis 120) between the base 106 and (e.g., the intersection 116 of) each rib 110 may vary around (e.g., the circumference or periphery of) the body 102.

The ribs 110 may be divided into a first (e.g., lower) set of ribs 122 and a second (e.g., upper) set of ribs 124. A handle 126 may be positioned between the first and second sets of ribs 122, 124. In at least one embodiment, the first set of ribs 122 may be symmetric to the second set of ribs 124 through a plane of symmetry 128 that extends through the handle 126. The plane of symmetry 128 may be perpendicular to the longitudinal axis 120. In another embodiment, the first and second sets of ribs 122, 124 may be parallel to one another (i.e., not be symmetric).

An axial distance between one of the first set of ribs 122 and the base 106 may vary from a first axial distance 130A at a first circumferential location (e.g., the left side of FIG. 1) to a second axial distance 130B at a second circumferential location (e.g., the right side of FIG. 1), where the first circumferential location is angularly-offset from the second circumferential location (e.g., by 180), and the first axial distance 130A is greater than the second axial distance 130B. Due to the symmetry, the axial distance between one of the second set of ribs 124 and the base 106 may vary from a third axial distance 132A at the first circumferential location to a fourth axial distance 132B at the second circumferential location, where the third axial distance 132A is less than the fourth axial distance 132B.

Figure 2:
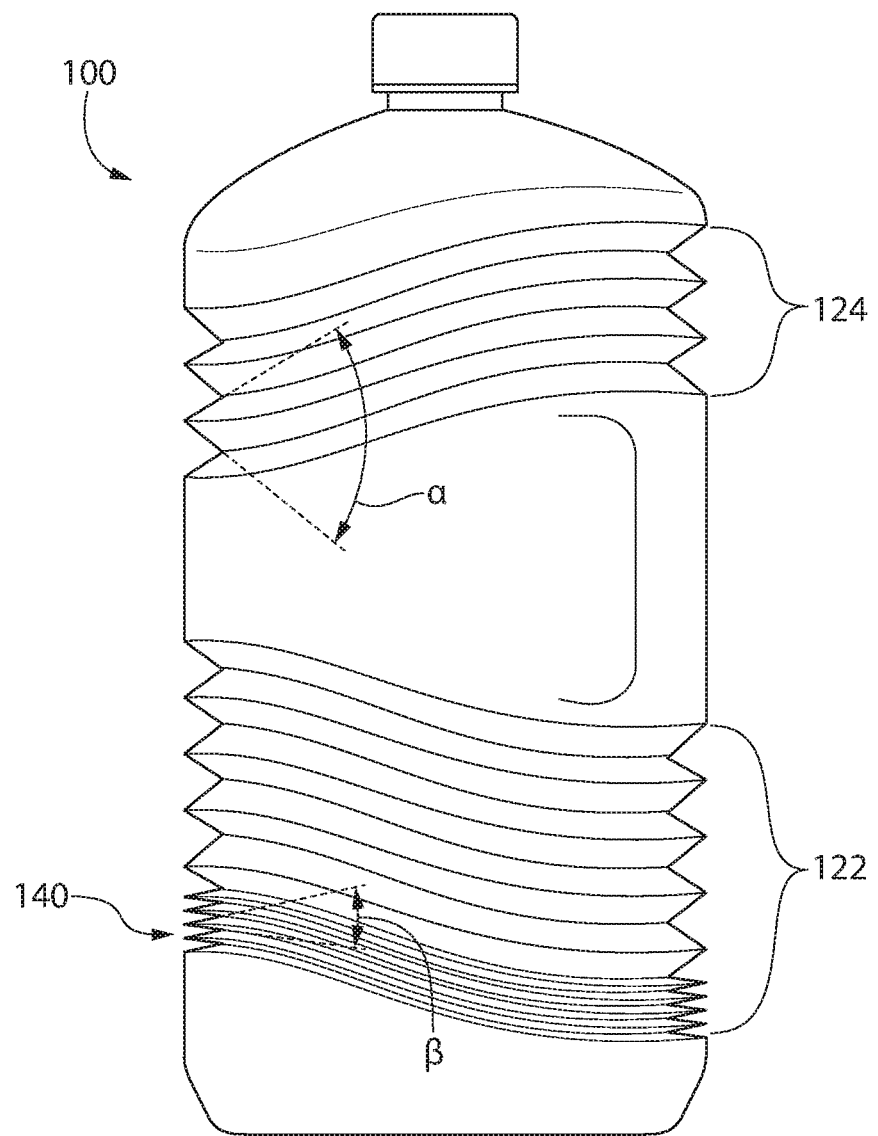
FIG. 2 depicts a side view of an example of the container after being compressed to a second volume, according to an embodiment.

FIG. 2 depicts a side view of an example of the container 100 after being compressed to a second volume that is less than the first volume, according to an embodiment. A first portion 140 of the ribs 110 may be compressed or otherwise reconfigured to decrease or reduce to the second volume inside the container 100. In the example shown, the first portion 140 (e.g., the compressed portion) of the ribs 110 is in the first (e.g., lower) set of ribs 122; however, the first portion 140 (e.g., the compressed portion) may also or instead be in the second (e.g., upper) set of ribs 124. As shown in the first portion 140, the upper and lower portions 112, 114 of the ribs 110 may be oriented at a second angle β with respect to one another when the respective rib 110 is in a second (e.g., compressed) state. The second angle β may be from about 1 to about 30°, about 2° to about 20°, or about 3° to about 10°. As shown in FIG. 2, the second (e.g., compressed) angle β is about 5°.

The wave-shape of the ribs 110 may help to lock or keep the ribs 110 in the second (e.g., compressed) state. More particularly, the wave-shape of the ribs 110 may inhibit uncompressing, or make it more difficult to re-expand, the ribs 110 back into the first (e.g., expanded) state when compared to conventional (e.g., planar) ribs.

Figure 3:
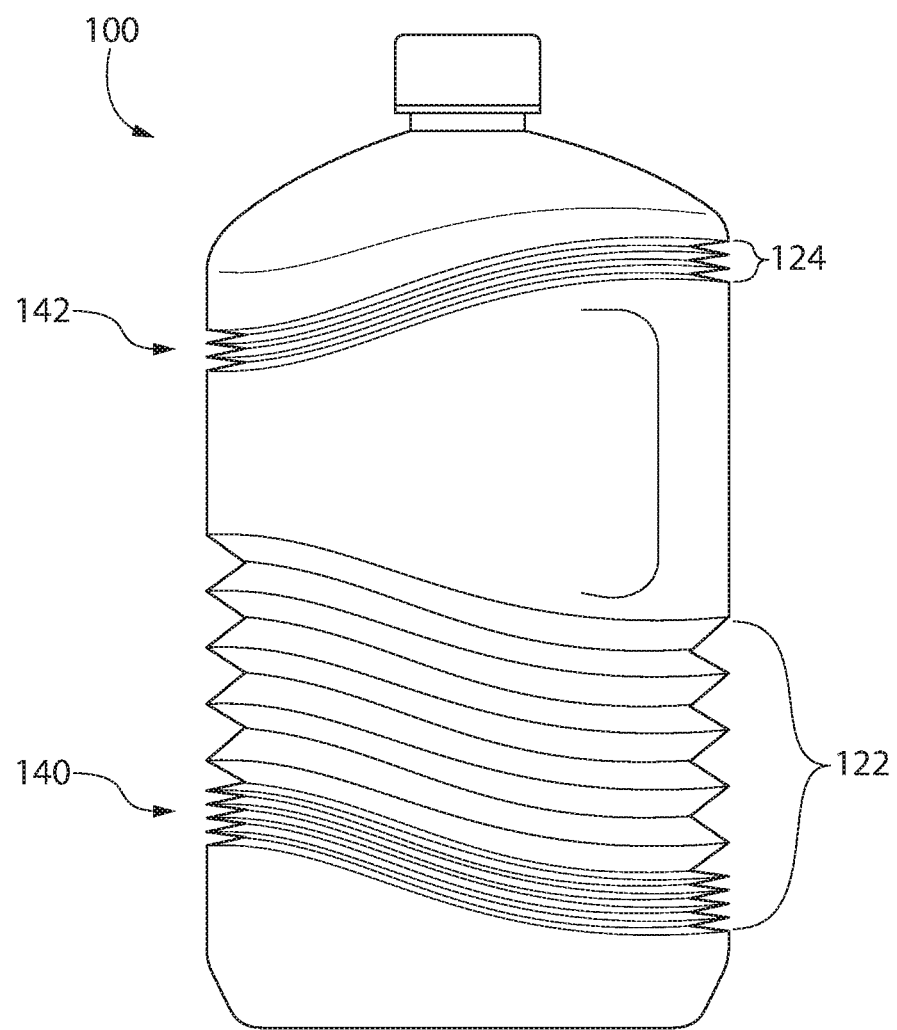
FIG. 3 depicts a side view of an example of the container after being compressed to a third volume, according to an embodiment.
Figure 4:
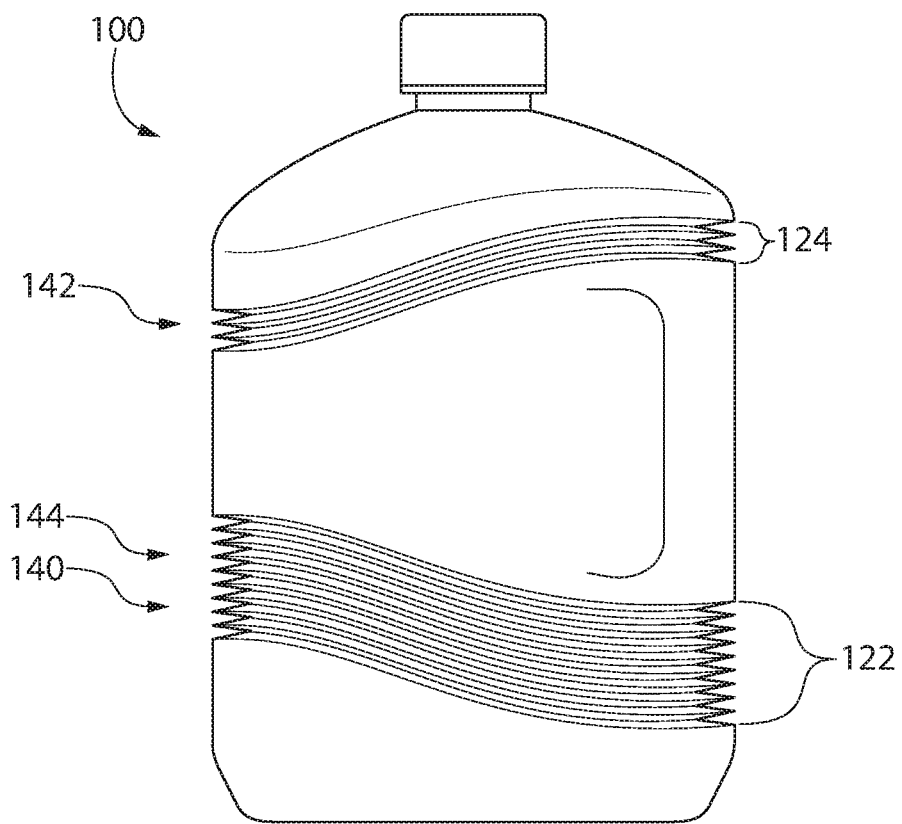
FIG. 4 depicts a side view of an example of the container after being compressed to a fourth volume, according to an embodiment.

FIG. 3 depicts a side view of an example of the container 100 after being compressed to a third volume, according to an embodiment. A second portion 142 of the ribs 110 may be compressed to decrease or reduce to the third volume inside the container 100. As shown, the second portion 142 of the ribs 110 may be in the second (e.g., upper) set of ribs 124; however, the second portion 142 may also or instead be in the first (e.g., lower) set of ribs 122. As shown in the example of FIG. 3, a portion 142, 140 may include all of some of the ribs 110 that are in a set of ribs 124 or 122. FIG. 4 depicts a side view of an example of the container 100 after being compressed to a fourth volume, according to an embodiment. A third portion 144 of the ribs 110 may be compressed or otherwise reconfigured to arrive at the fourth volume. As shown, the third portion 144 of the ribs 110 may be in the first (e.g., lower) set of ribs 122; however, the third portion 144 may also or instead be in the second (e.g., upper) set of ribs 124.

The ribs 110 may be constructed such that some ribs 110 (e.g., the first portion 140) compress before other ribs 110 (e.g., the second portion 142) by making some of the ribs 110 (e.g., the first portion 140) lighter/weaker than the other ribs 110 (e.g., the second portion 142) or by varying the angles of the ribs in the expanded state. By being able to control the compression sequence, the heights and sizes of the container 100 can be maintained on the production line. The visual look of multiple containers 100 may also be consistent if the ribs 110 compress in the same sequence in response to the same compression forces.

Figure 5:
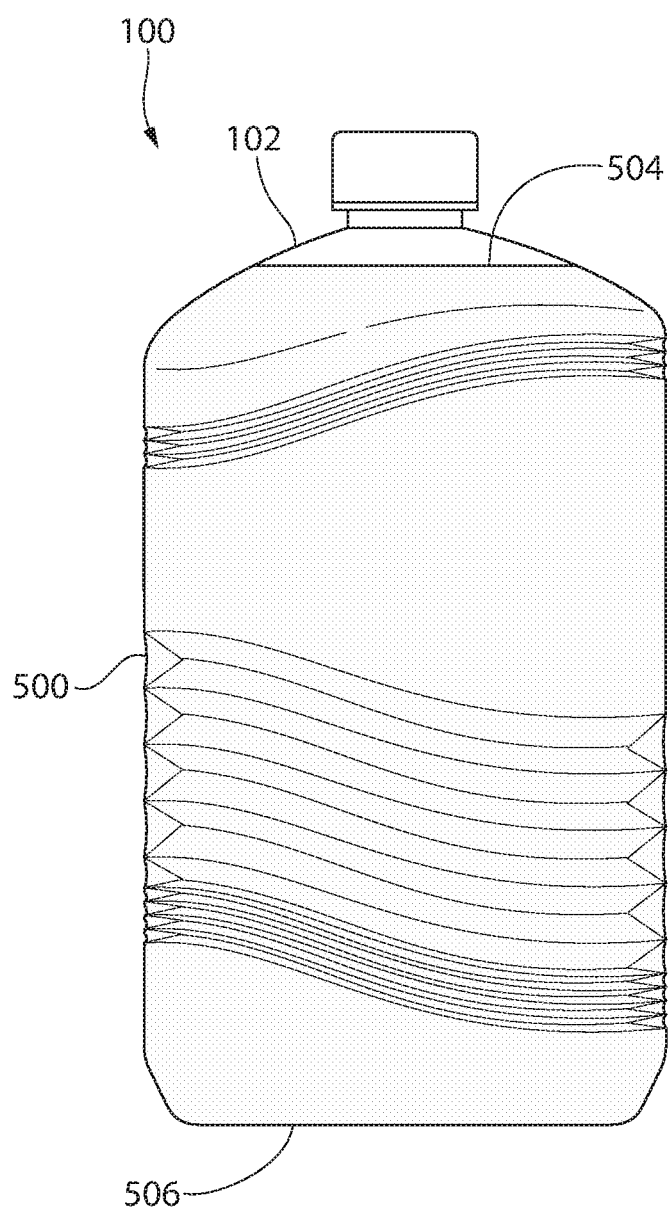
FIG. 5 depicts a side view of an example of a sleeve being positioned around the container after the container is at least partially compressed, according to an embodiment.
Figure 6:
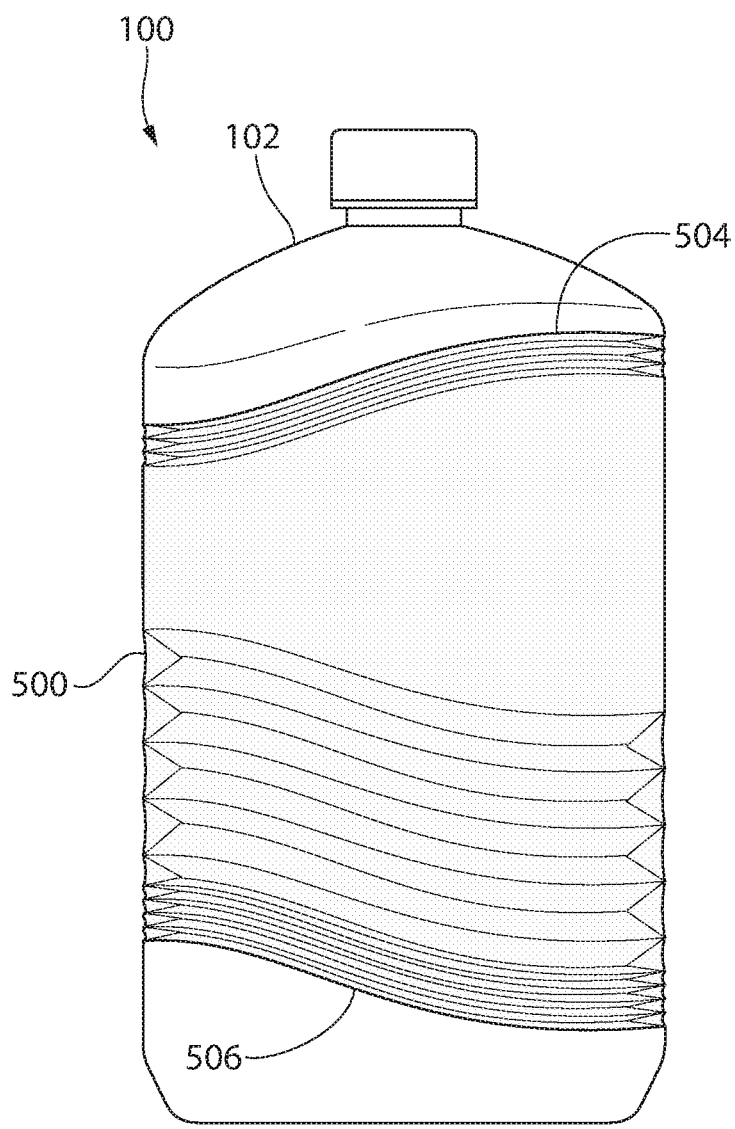
FIG. 6 depicts a side view of another example of the sleeve being positioned around the container after the container is at least partially compressed, according to an embodiment.

FIG. 5 depicts a side view of an example of a sleeve 500 that is positioned around the container 100 after the container 100 is at least partially compressed, according to an embodiment. As used herein, the term "at least partially compressed" refers to at least one of the ribs 110 being actuated into the second (e.g., compressed) state. The sleeve 500 may be slid over the upper end 104 or the lower end 106. The sleeve 500 may be positioned at least partially around one or more of the ribs 110. For example, the sleeve 500 may be positioned around one or more of the ribs 110 in the expanded state and/or one or more of the ribs 110 in the compressed state. In at least one embodiment, due to the wave-shape of the ribs 110 and the straight edge shape of the upper and lower ends 504, 506 of the sleeve 500, the sleeve 500 may be positioned around a portion of one or more of the ribs 110, but not around the full 360 circumference or periphery of those one or more of the ribs 110. In another embodiment, the upper and lower ends 504, 506 of the sleeve 500 may have a wave-shape that corresponds to the wave-shape of the ribs 110 such that the sleeve 500 is positioned around the full 360° of one or more of the ribs 110 (see FIG. 6).

The sleeve may be elastic or have an elastic property. The sleeve 500 may be made of oriented polystyrene (OPS), polyethylene terephthalate (PETG or PET), polyvinyl chloride (PVC), OPS/PETG coextrusions, polyolefin, or the like. The material may allow the sleeve 500 to stretch or flex radially and/or axially. In one example, the sleeve 500 may be able to stretch radially but not axially. As such, when positioned around the ribs 110, the sleeve 500 may apply a radially-inward gripping force that helps to secure the ribs 110 in their current state (e.g., the expanded state and/or the compressed state). In other words, the sleeve 500 may exert a force on the ribs 100 that prevents, hinders or otherwise inhibits the ribs 110 from actuating into a different state. In another embodiment, the sleeve 500 may prevent, hinder or otherwise inhibit the ribs 110 in the compressed state from actuating into the expanded state, but may allow the ribs 110 in the expanded state to be actuated into the compressed state. As used herein, the terms "hinder" and "inhibit" mean that a greater force is needed to actuate the ribs 110 into the expanded state when the sleeve 500 is wrapped around the ribs 110 than when the sleeve 500 is not present.

Figure 7:
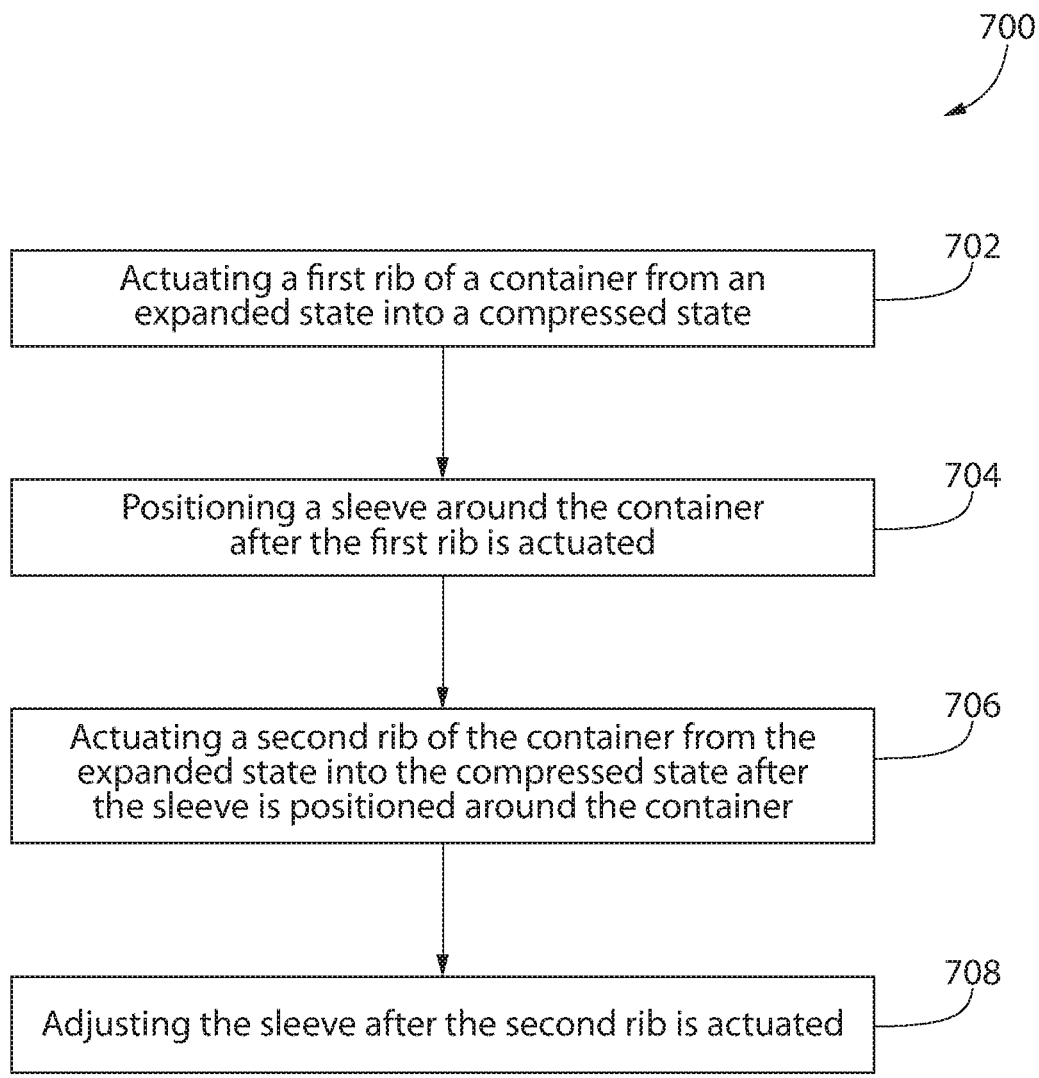
FIG. 7 depicts a flowchart of a method for using the container, according to an embodiment.

FIG. 7 depicts a flowchart of a method 700 for using the container 100, according to an embodiment. The method 700 may include actuating a first of the ribs 110 from the expanded state into the compressed state, as at 702. A user may do this by manually pressing the upper end 104 downward toward the lower end 106 to decrease the height of the body 102. Optionally, the user may grasp the handle 126 with one hand while pressing the upper end 104 with the other hand, such that one or more rib from the upper set 124 of ribs compresses instead of one or more rib from the lower set 122 of ribs.

The method 700 may also include positioning the sleeve 500 around the body 102, as at 704. The sleeve 500 may be positioned around the body 102 after the first rib 110 is actuated into the compressed state. Positioning the sleeve 500 around the body 102 may include positioning the upper end 504 of the sleeve 500 on the upper shoulder of the body 102 (e.g., above the upper set 124 of ribs and below the cap 108) and positioning the lower end 506 of the sleeve 500 under the lower end 106 of the body 102 (e.g., below the lower set 122 of ribs). Alternatively, positioning the sleeve 500 around the body 102 may include positioning the upper end 504 of the sleeve 500 at least partially within a radial recess in the body 102. The radial recess may be the space between two adjacent ribs 110 in the second (e.g., upper) set 124, e.g., the space at or adjacent to the intersection 118 between two adjacent ribs. Positioning the sleeve 500 around the body 102 may include pulling/stretching the sleeve 500 to its full length. When the sleeve 500 is at its full length, the lower end 506 of the sleeve 500 may be positioned at least partially within another radial recess in the body 102 (or below the lower set 122 or ribs). This radial recess may be the space between two adjacent ribs 110 in the first (e.g., lower) set 122 of ribs. When the sleeve 500 is pulled/stretched to its full length, and the first and second ends 504, 506 are positioned at least partially in recesses in the body 102, the ribs 110 that are at least partially positioned within the sleeve 500 and in the compressed state cannot be actuated into or may be difficult to move into the expanded state due to the force exerted on them by the sleeve 500.

The method 700 may also include actuating a second of the ribs 110 from the expanded state into the compressed state after the sleeve 500 has been positioned around the body 102, as at 706. In at least one embodiment, the sleeve 500 may be positioned around the second rib 110 before and/or when the second rib 110 is actuated into the compressed state. The axial length of the body 102 may be reduced when the second rib 110 is actuated into the compressed state. The method 700 may also include adjusting the sleeve 500 after the second rib 110 is actuated, as at 708. Adjusting the sleeve 500 may include pulling/stretching the sleeve 500 axially back to its full stretched-out length, as the sleeve 500 may become wrinkled, folded, pleated, pinched, or the like after as the axial length of the body 102 is reduced by compression of the second rib 110. This adjusting may include moving the upper end 504 of the sleeve 500 into a radial recess above the initial radial recess in which the upper end 504 was positioned, or moving the lower end 506 of the sleeve 500 into a radial recess below the initial radial recess in which the lower end 506 was positioned.

What is claimed is:

1. A container, comprising:
a body having an upper end and a lower end, wherein the upper end has an opening formed therethrough, and wherein the body defines a plurality of ribs between the upper end and the lower end that are configured to actuate between an expanded state and a compressed state to vary a volume inside the body; and
a sleeve, positioned at least partially around the body, that inhibits one or more of the plurality of ribs that are in the compressed state from actuating into the expanded state,
wherein the sleeve has an elastic property so as to allow one or more of the plurality of ribs that are positioned within the sleeve and in the expanded state to actuate into the compressed state.

2. The container of claim 1, wherein at least one of the plurality of ribs is non-planar.

3. The container of claim 1, wherein an axial distance between the lower end of the body and a first rib of the plurality of ribs varies proceeding around a circumference of the body.

4. The container of claim 1, wherein a first rib of the plurality of ribs comprises an upper portion and a lower portion, wherein the upper portion and the lower portion are oriented at a first angle with respect to one another from about 40° to about 140° when the first rib is in the expanded state, and wherein the upper portion and the lower portion are oriented at a second angle with respect to one another from about 2° to about 20° when the first rib is in the compressed state.

5. The container of claim 1, further comprising:
a handle;
wherein the plurality of ribs comprises a first set of ribs and a second set of ribs, and wherein the handle is positioned between the first set of ribs and the second set of ribs.

6. The container of claim 5, wherein a first rib in the first set of ribs is symmetric to a second rib in the second set of ribs through a plane of symmetry that extends through the handle.

7. The container of claim 1, wherein the plurality of ribs comprises a first rib and a second rib, wherein an axial distance between the lower end of the body and the first rib varies from a first axial distance at a first angular location on the body to a second axial distance at a second angular location on the body that is angularly-offset from the first location, the first axial distance being greater than the second axial distance, and wherein an axial distance between the lower end of the body and the second rib varies from a third axial distance at the first angular location on the body to a fourth axial distance at the second angular location on the body, the third axial distance being less than the fourth axial distance.

8. The container of claim 1, wherein the body comprises:
a first radial recess defined between a first pair of the plurality of ribs; and
a second radial recess defined between a second pair of the plurality of ribs;
wherein the sleeve includes an upper end and a lower end; and
wherein the upper end of the sleeve is positioned in the first radial recess in the body, and wherein the lower end of the sleeve is positioned in the second radial recess in the body.

9. A container, comprising:
a body having an upper end and a lower end, wherein the upper end has an opening formed therethrough, wherein the body defines a plurality of ribs between the upper end and the lower end that are configured to actuate between an expanded state and a compressed state to vary a volume inside the body, and wherein a first rib of the plurality of ribs is non-planar such that an axial distance between the lower end of the body and a first rib of the plurality of ribs varies proceeding around the body; and
a sleeve positioned at least partially around the body that inhibits one or more of the plurality of ribs that are positioned within the sleeve and in the compressed state from actuating into the expanded state, and wherein the sleeve is configured to allow one or more of the plurality of ribs that are positioned within the sleeve and in the expanded state to actuate into the compressed state,
wherein the sleeve is configured to stretch in a radial direction but not in an axial direction.

10. The container of claim 9, wherein an axial distance between the lower end of the body and an upper end of the sleeve varies proceeding around the body such that a shape of the upper end of the sleeve substantially corresponds to the first rib.

11. The container of claim 9, wherein an upper end of the sleeve is positioned on an upper shoulder of the body, and wherein a lower end of the sleeve is positioned under the lower end of the body.

12. The container of claim 9, wherein the body includes a recess that is defined between two ribs of the plurality of ribs;
wherein the sleeve includes an upper end and a lower end; and
wherein the upper end of the sleeve is at least partially positioned in the recess in the body.

13. A method for using a container, comprising:
compressing a first rib defined by a body of the container into a compressed state to reduce a volume inside the body;
positioning a sleeve around the body after the first rib is in the compressed state to inhibit the first rib from actuating into an expanded state,
wherein positioning the sleeve around the body comprises:
positioning an upper end of the sleeve in a first radial recess defined in the body;
pulling the sleeve to a full length of the sleeve; and
positioning a lower end of the sleeve in a second radial recess defined in the body; and
compressing a second rib defined by the body into the compressed state after the sleeve is positioned around the body, wherein compressing the second rib moves the upper end of the sleeve closer to the lower end of the sleeve, thereby reducing the length of the sleeve.

14. The method of claim 13, wherein:
the body of the container has an upper end and a lower end,
the upper end has an opening formed therethrough,
the body defines a plurality of ribs between the upper end and the lower end that are configured to actuate between the expanded state and a compressed state to vary a volume inside the body,
the first rib is one of the plurality of ribs, and
the sleeve is positioned at least partially around the body.

15. The method of claim 13, further comprising adjusting the sleeve after the second rib is compressed, wherein adjusting the sleeve comprises:
positioning the upper end of the sleeve in a third radial recess defined in the body that is above the first radial recess; or
positioning the lower end of the sleeve in a third radial recess defined in the body that is below the second radial recess.

* * * * *